Oct. 3, 1961  E. S. PHILLIPS ET AL  3,002,744
MOTOR JACK
Filed Dec. 19, 1958
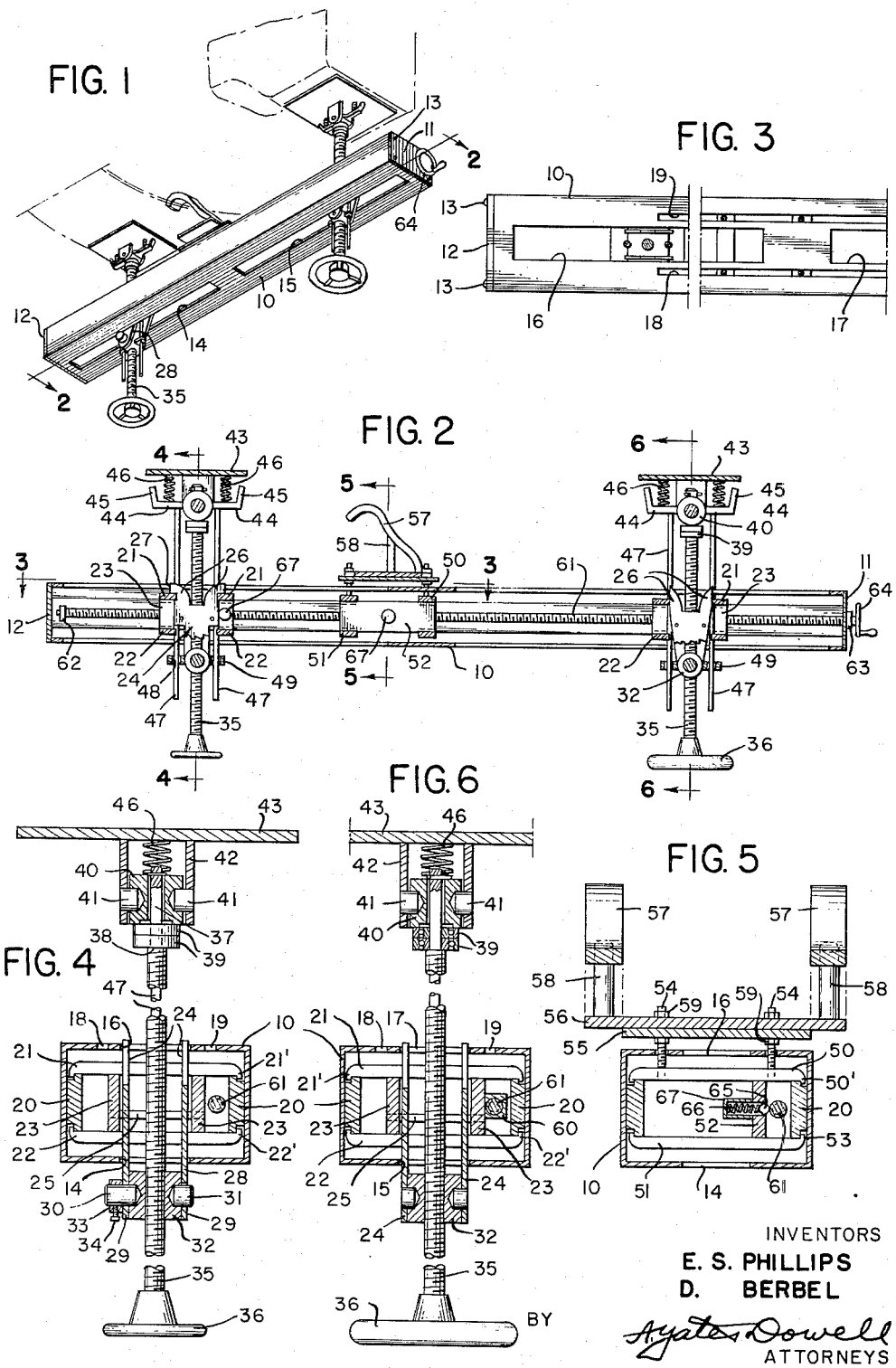
INVENTORS
E. S. PHILLIPS
D. BERBEL
BY
ATTORNEYS

United States Patent Office 3,002,744
Patented Oct. 3, 1961

3,002,744
MOTOR JACK
Elmer S. Phillips and Daniel Berbel, both of
4328 Ave. S, Galveston, Tex.
Filed Dec. 19, 1958, Ser. No. 781,567
9 Claims. (Cl. 269—115)

This invention relates to automobiles and other motor driven vehicles, to the maintenance and repair of the same and requiring the removal of certain of the parts thereof, and to the method of operation of equipment employed in connection therewith.

The invention relates particularly to equipment for supporting and maintaining a motor of a vehicle in a fixed position during the removal and the replacement of the transmission whereby the parts may be disposed in proper alignment and readily reassembled.

In the removal and replacement of the transmissions of motor vehicles, difficulty has been experienced in realigning the parts for reassembly, the motor being heavy and difficult to handle and due to such difficulty of alignment much time has been lost in this type of operation.

It is an object of the invention to overcome the difficulties heretofore experienced and to provide equipment for maintaining the motor of a vehicle in fixed position relative to other parts during the removal and replacement of the transmission so that the parts can be readily aligned and reassembled.

Another object of the invention is to provide structure of the character indicated and including an elongated jack unit capable of being suspended from the forward cross member of an automobile frame in a manner to support the motor; the suspension being by means of a hook unit of a configuration to fit over the top of a cross member and with a pair of connected jack units on opposite sides of the same, one constructed to bear against the bottom of the cross member and the one on the opposite side of the hook unit being adapted to support the motor in a fixed position to allow the transmission of the automobile to be removed and replaced.

Other objects and advantages of the invention will be apparent from the following description taken in conjunction with the accompanying drawing wherein:

FIG. 1 is a perspective viewed from below illustrating one application of the invention;
FIG. 2, a section on the line 2—2 of FIG. 1;
FIG. 3, a section on the line 3—3 of FIG. 2;
FIG. 4, a section on the line 4—4 of FIG. 2;
FIG. 5, a section on the line 5—5 of FIG. 2, and
FIG. 6, a section on the line 6—6 of FIG. 2.

Briefly stated the invention comprises a device for maintaining the motor of a vehicle in fixed position during the removal of the transmission ready for reapplication, realignment and assembly. An elongated jack is suspended at one end from the forward cross member of an automobile frame by means of a hook unit which engages the top of the cross member and an adjustable cross member jack unit which engages the bottom of the cross member. The opposite end of the jack is adapted to receive an adjustable motor jack unit which will support the motor in a fixed position ready for realignment when the transmission of the automobile is removed.

With continued reference to the drawing, the jack of the present invention comprises an elongated hollow box or beam 10 having end plates 11 and 12 secured to the beam 10 by screws 13. The bottom of the beam 10 is provided with a pair of relatively wide openings or slots 14 and 15 and the top of the beam is provided with corresponding slots 16 and 17 and a pair of narrow slots 18 and 19 located one on each side of the slots 16 and 17. A T-shaped slide or track 20 is mounted along the inner surface of each of the sides of the beam 10.

A cross member jack unit is provided at one end of the beam 10 comprising a sliding shoe having a pair of spaced upper slides 21 and a pair of spaced lower slides 22 connected by a pair of braces 23. The slides 21 have downwardly extending projections 21′, see FIG. 4, at their outer ends and the slides 22 have upwardly extending projections 22′ at their outer ends. Projections 21′ and 22′ are in cooperative sliding engagement with the tracks 20. A pair of strain or limit plates 24 are provided which extend through the slots 14 and 16 and such plates are mounted on the braces 23 by pins 25. The top portions 26 of the limit plates 24, see FIG. 2, are curved inwardly and are provided with susbtantially vertical faces 27 which engage the ends of the slots 14 and 16 to prevent excessive endwise movement of the cross member jack unit. The lower portions 28 of the limit plates 24 are provided with openings 29 for the reception of pivots 30 and 31 carried by a spacer 32 and one of such limit plates is adapted to have a bushing 33 mounted thereon in which a set screw 34 is disposed to maintain the spacer 32 in fixed relation to the limit plates 24.

A screw shaft 35 is threadedly received centrally of the spacer 32 and is vertically adjustable therein. A hand wheel 36 is fixed to the lower end of the screw shaft 35 and the upper end of such screw shaft has a reduced portion 37 and a shoulder 38 which support the inner races of a pair of ball bearings 39. The outer races of the bearings 39 support a spacer 40, generally similar to the spacer 32, and adapted to carry pivots 41 which pivotally support a pair of depending lugs 42 attached to a top jack plate 43.

In order to maintain the top jack plate 43 in substantially perpendicular relation to the screw shaft 35 and insure correct engagement of such plate, the spacer 40 is adapted to have a lateral projection or arm 44 extending from each side thereof, the outer end 45 of which is extended upwardly to provide a limit stop for the plate 43. A pair of springs 46 is interposed between the arms 44 and the plate 43 to maintain such arms and plate in substantially parallel relation when the unit is not in use.

A depending guide rod 47 is mounted on the bottom of each of the arms 44 and extends downwardly through the beam 10. The lower extremities of the guide rod 47 are slideably contained within openings 48 in arms 49 extending laterally from each side of the spacer 32 to maintain the spacer 40 in alignment with the spacer 32.

A cross member hook unit is provided for use in cooperation with the cross member jack unit. The cross member hook unit comprises a sliding shoe having a pair of spaced upper slides 50 and a pair of spaced lower slides 51 connected by a cross brace 52. The slides 50 have downwardly extending projections 50′ at their outer ends and the slides 51 have upwardly extending projections 53 at their outer ends with projections 50′ and 53 in cooperative sliding engagement with the tracks 20. A pair of studs 54 are mounted in each of the upper slides 50 and extend upwardly through the slots 18 and 19. A base plate 55 is mounted in spaced relation above the beam 10 and is adapted to support a hook plate 56 having hooks 57 one at each side thereof. A vertical rod or support 58 is attached to the hook plate 56 and supports each hook 57 substantially midway of the height of such hook. Base plate 55 and the hook plate 56 are held in spaced relation to the beam 10 by means of lock nuts 59.

At the end of the beam opposite the cross member jack unit a motor jack unit is provided of a construction similar to the cross member jack unit having a slide shoe with slides 21 and 22 and braces 23, limit plates 24 mounted on the braces 23 by pins 25, a spacer 32 carried between the lower portions of such limit plates, a screw shaft 35 threadedly received centrally of the spacer 32, likewise similar bearings 39, spacer 40, pivots 41 engaging depending lugs 42 from a top jack plate 43.

One of the braces 23 of the motor jack unit is provided with a lug 60 or projection mounted on one side thereof and provided with internal threads for cooperative engagement with the external threads of a screw shaft 61.

The screw shaft 61 extends substantially the full length of the beam 10 and is held by a swivel plate 62 adjacent the end plate 12 and extends through a bushing 63 mounted on the end plate 11. A hand adjusting wheel 64 is mounted on the end of the shaft adjacent the end plate 11 to cause rotation of the screw shaft 61 to move the motor jack unit along the length of the beam 10.

The cross member jack unit and the cross member hook unit are movable lengthwise of the beam 10 and are maintained in adjusted position by a ball 65 under tension from a spring 66 carried in the housing 67 and held in intimate engagement with the screw shaft 61 to hold the cross member jack unit and the cross member hook unit in position.

In the operation of the device the cross member hook unit is suspended from the forward cross member of the automobile frame and the cross member jack unit is shifted laterally and adjusted vertically so that the plate 43 engages a fixed part of the automobile to maintain the beam in substantially parallel relation with the frame of the automobile. The motor jack unit is then adjusted horizontally and vertically to rigidly support the motor casing so that the transmission may be removed and then reassembled without the usual aligning problems.

It will be apparent that a relatively simple jack is provided which does not depend on any surface other than the automobile being repaired for its leverage and which may be used when the automobile has been raised to allow more working area beneath the same.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A device for supporting and adjusting a portion of an automobile with respect to the frame of the automobile comprising a beam, a cross member jack unit adjacent one end of the beam and slidable therealong, a motor jack unit adjustable longitudinally of the beam adjacent the other end of the beam, a hook adjustable longitudinally of the beam intermediate the two jack units, and interconnected driving means between the beam and the motor jack unit to shift the motor jack unit along the beam.

2. A device for supporting and adjusting a portion of an automobile with respect to the frame of the automobile comprising a beam, a cross member jack unit adjacent one end of the beam and slidable therealong, a motor jack unit adjustable longitudinally of the beam adjacent the other end of the beam, a hook adjustable longitudinally of the beam intermediate the two jack units, and interconnected driving means between the beam and the motor jack unit to shift the motor jack unit along the beam, said driving means comprising a threaded shaft extending longitudinally of the beam provided at one end with a hand control and engageable with a threaded projection fixed with relation to the motor jack unit.

3. A device for supporting and adjusting a portion of an automobile with respect to the frame of said automobile comprising a beam, a hook longitudinally adjustable on the beam adapted to engage a cross member of the frame, a cross member jack unit adapted to engage a second cross member of the frame, said cross member jack unit being longitudinally adjustable on the beam, and a motor jack unit also longitudinally adjustable on the beam, each of said jack units having a supporting plate, means forming part of each jack unit for adjusting its plate to move it transversely of the beam, and a threaded shaft threaded through the beam for adjusting the motor jack unit along the beam.

4. A device for supporting and adjusting a portion of an automobile with respect to the frame of said automobile comprising a beam, a hook longitudinally adjustable on the beam adapted to engage a cross member of the frame, a cross member jack unit adapted to engage a second cross member of the frame, said cross member jack unit being longitudinally adjustable on the beam, and a motor jack unit also longitudinally adjustable on the beam, each of said jack units having a supporting plate, means forming part of each jack unit for adjusting its plate to move it transversely of the beam, and a threaded shaft threaded through the beam for adjusting the motor jack unit along the beam, said hook having readily releasable detent means engageable with said threaded shaft.

5. A supporting and adjusting device comprising a beam, a hook and a pair of jack units all mounted on the beam, at least one of said jack units comprising a shoe slidable along the length of the beam, a spacer supported by said shoe, a screw shaft threaded through said spacer and positionable transversely to the beam, a pivoted plate at a free end of the screw shaft, and stop arms positioned on said free end of the screw shaft for limiting the pivotal movement of the plate.

6. A supporting and adjusting device comprising a beam, a hook and a pair of jack units all mounted on the beam, at least one of said jack units comprising a shoe slidable along the length of the beam, a spacer supported by said shoe, a screw shaft threaded through said spacer and positionable transversely to the beam, a pivoted plate at a free end of the screw shaft, and stop arms positioned on said free end of the screw shaft for limiting the pivotal movement of the plate, together with springs to maintain the plate normally in a position perpendicular to the screw shaft.

7. A supporting and adjusting device comprising a beam, a hook and a pair of jack units, all mounted on the beam, at least one of said jack units comprising a shoe slidable along the length of the beam, a spacer pivotally supported by the shoe, a screw shaft threaded through said spacer and angularly adjustable with respect to the beam, a pivoted plate at a free end of the screw shaft, and a stop arm positioned on said free end of the shaft for limiting the pivotal movement of the plate.

8. A supporting and adjusting device comprising a beam, a hook and a pair of jack units, all mounted on the beam, at least one of said jack units comprising a shoe slidable along the length of the beam, a spacer pivotally supported by the shoe, a screw shaft threaded through said spacer and angularly adjustable with respect to the beam, a pivoted plate at a free end of the screw shaft, a stop arm positioned on said free end of the shaft for limiting the pivotal movement of the plate, said spacer having an apertured arm and said stop arm having a guide rod slidable in the aperture of the arm.

9. A supporting and adjusting device comprising a beam, a hook and a pair of jack units all mounted on the beam, at least one of said jack units comprising a shoe slidable along the length of the beam, a spacer pivotally supported by the shoe, a screw shaft threaded through said spacer and angularly adjustable with respect to the beam, a plate having a universal pivotal connection with a free end of the screw shaft, and means for limiting that pivotal movement of said plate which is about an axis perpendicular to the screw shaft.

References Cited in the file of this patent

UNITED STATES PATENTS

| | | |
|---|---|---|
| 1,284,124 | Mazier | Nov. 5, 1918 |
| 1,497,107 | Lasell | June 10, 1924 |
| 2,320,805 | Smith | June 1, 1943 |
| 2,787,234 | Mach | Apr. 2, 1957 |
| 2,865,585 | Beyer et al. | Dec. 23, 1958 |